Nov. 1, 1938.　　　　　E. O. KEATOR　　　　　2,135,307
VEHICLE WHEEL
Filed Jan. 2, 1934　　　　4 Sheets-Sheet 1
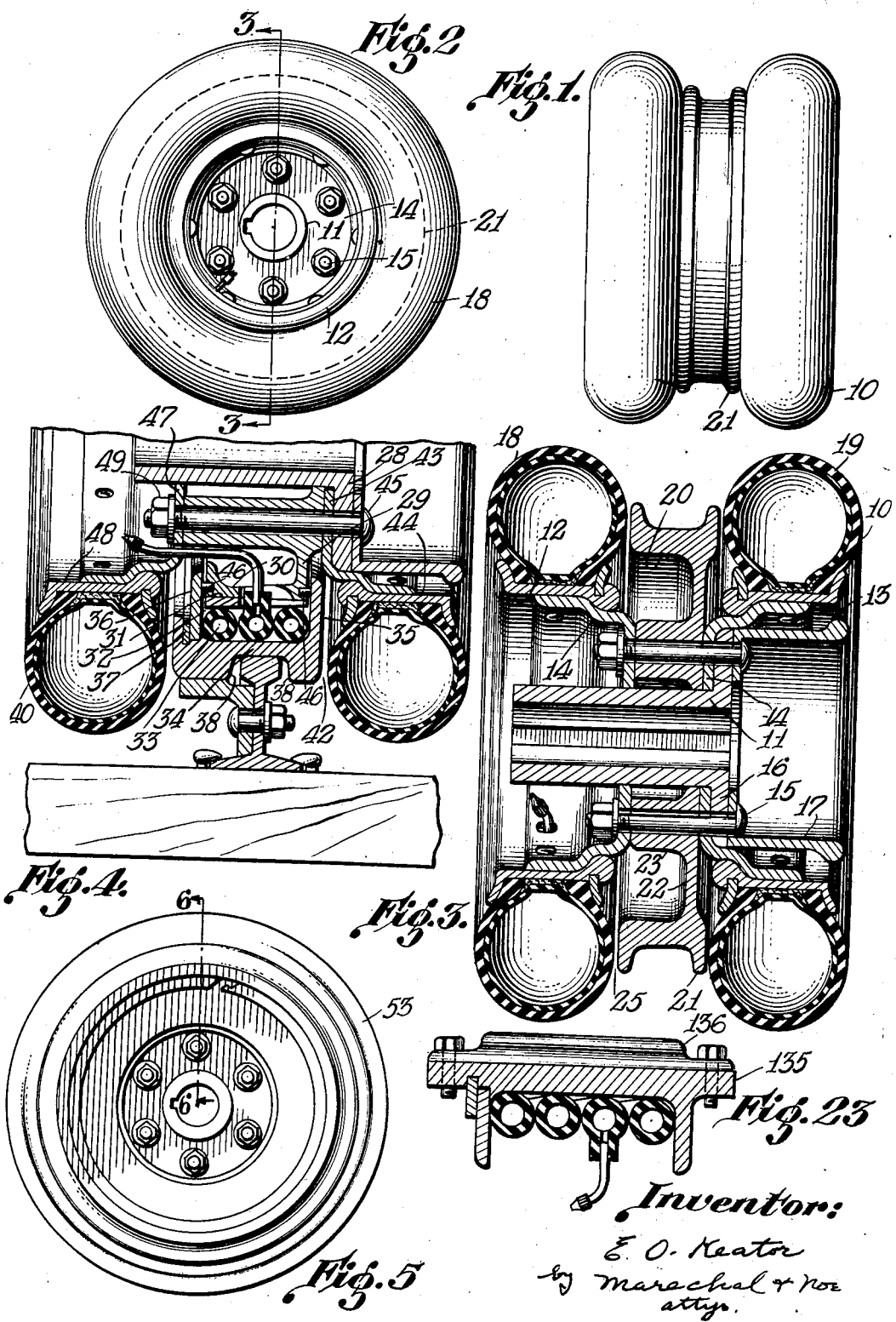

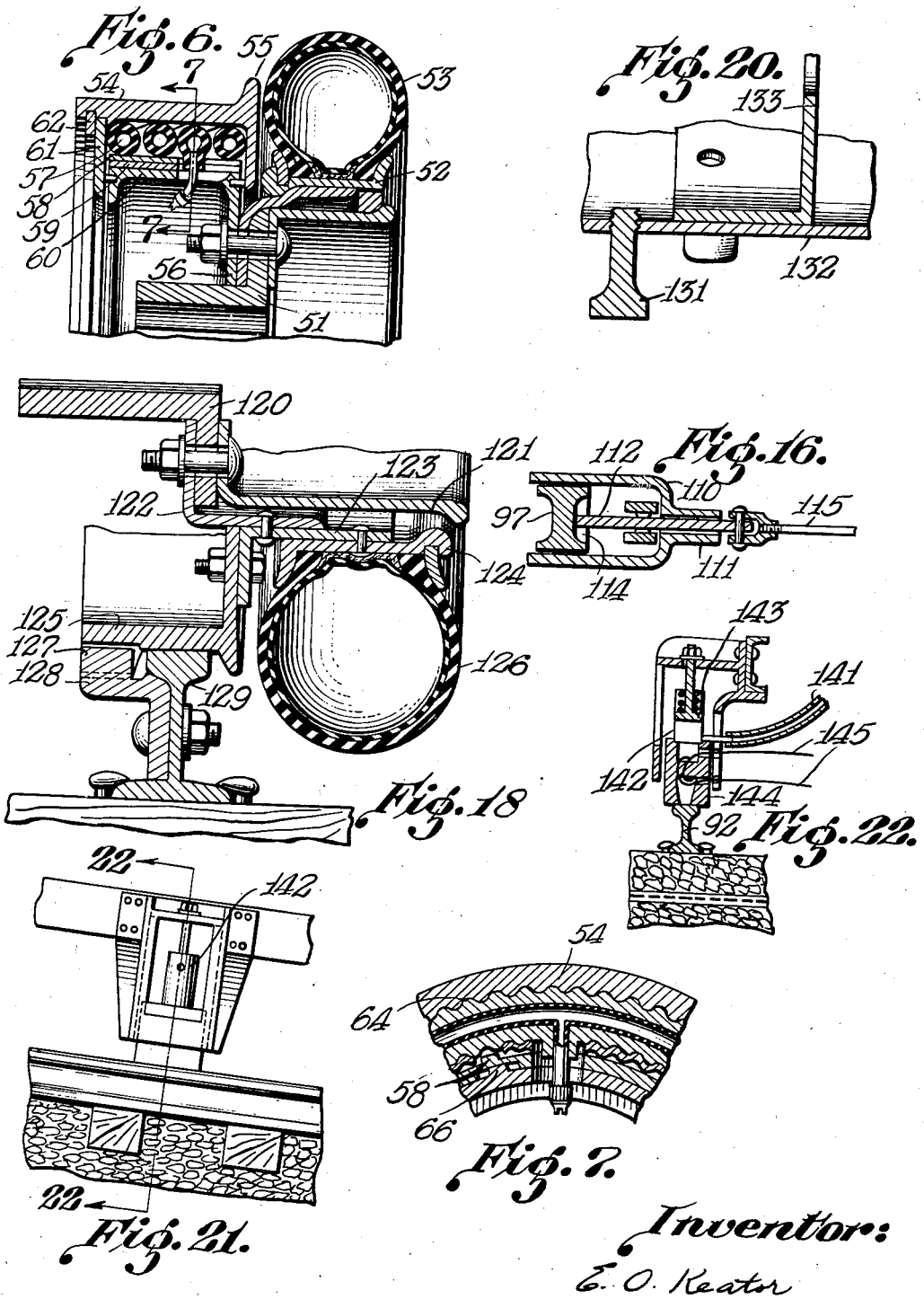

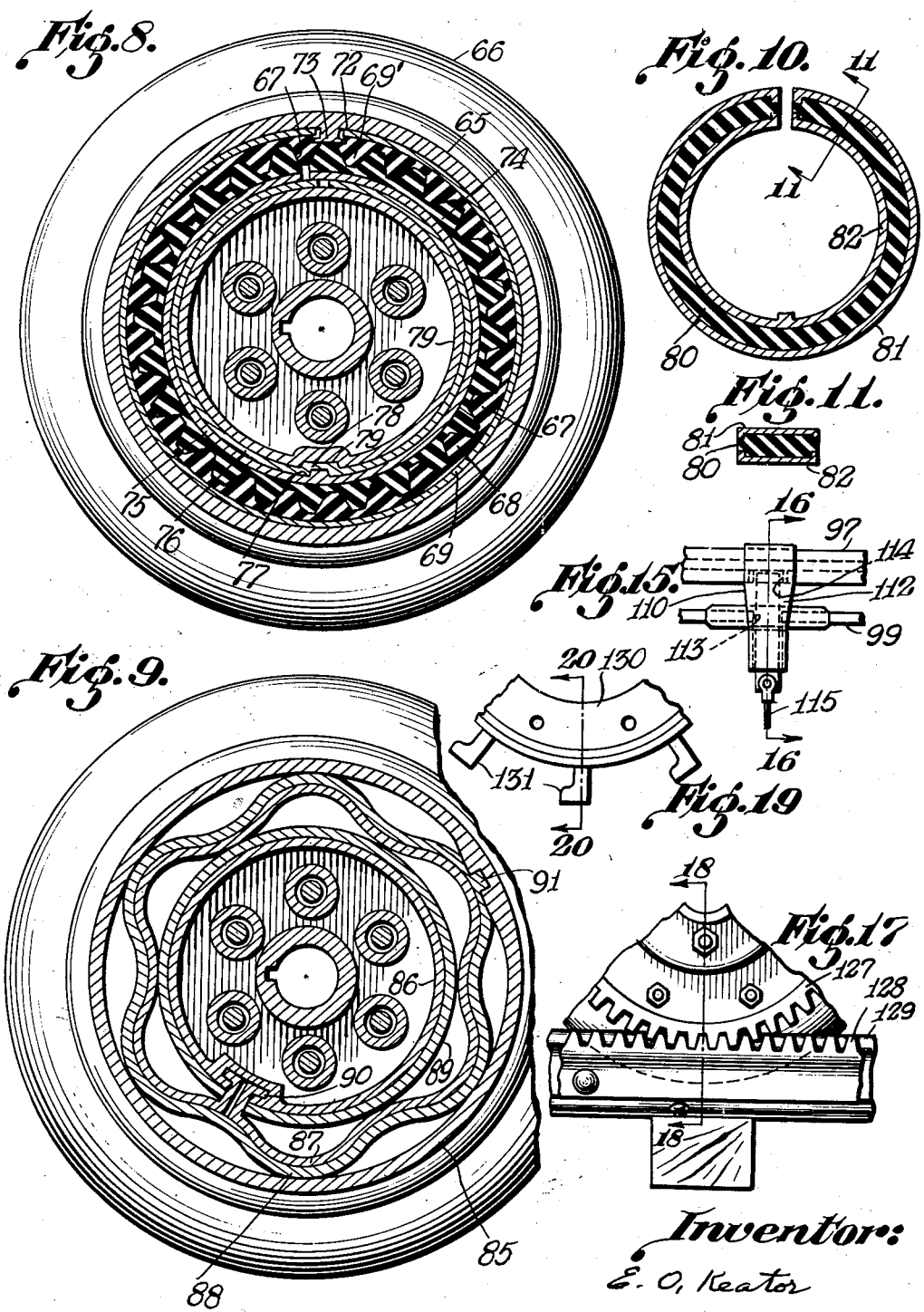

Nov. 1, 1938.  E. O. KEATOR  2,135,307
VEHICLE WHEEL
Filed Jan. 2, 1934    4 Sheets-Sheet 4

INVENTOR
E. O. Keator
BY Maréchal + Noe
ATTORNEY

Patented Nov. 1, 1938

2,135,307

UNITED STATES PATENT OFFICE 2,135,307

VEHICLE WHEEL

Edward O. Keator, Dayton, Ohio

Application January 2, 1934, Serial No. 704,882

4 Claims. (Cl. 295—8.5)

This invention relates to motor vehicles and the like.

One object of the invention is the provision of a motor vehicle having wheels which are adapted for operation on rails and also adapted for operation on a pavement or road.

Another object of the invention is the provision of a motor vehicle wheel having a common hub supporting an inflatable rubber surfaced tire adapted for operation on a pavement and also a metal tire or tractive member adapted for operation on a rail or on the ground.

Another object of the invention is the provision of a motor vehicle wheel of the character mentioned, in which resilient means is provided between a wheel felly and the metal tire for cushioning the shocks encountered in operation on rails or on the ground.

Another object of the invention is the provision of a truck or the like having dual rubber tired wheels, a flanged metal tire adapted for operation on a rail being provided between the rubber tires and serving to prevent stones from jamming between the rubber tires while the truck is in operation on a rough road.

Another object of the invention is the provision of a truck having wheels adapted to be steered which can be locked against steering movement, the wheels being equipped with tires adapted for operation on a pavement or road and also having metal tires adapted for operation on rails.

Another object is the provision of a truck having differentially driven rear wheels which are adapted for operation on rails, the wheels being adapted for positive driving engagement with the rails by means of gear means engaging racks provided on the rails.

Other objects and advantages will be apparent from the following description, the appended claims and the accompanying drawings, in which—

Fig. 1 is a front elevation of a wheel embodying the present invention;

Fig. 2 is a side view of the wheel;

Fig. 3 is a vertical central section on the line 3—3 of Fig. 2;

Fig. 4 is a sectional view showing a modified form of construction;

Fig. 5 is a side view of the front wheel;

Fig. 6 is a section on the line 6—6 of Fig. 5;

Fig. 7 is a sectional view on the line 7—7 of Fig. 6;

Fig. 8 is a vertical sectional view taken vertically through the steel tire of a wheel of a modified form of construction;

Fig. 9 shows a further modification of the invention;

Fig. 10 shows one form of resilient means for the steel tire;

Fig. 11 is a section on the line 11—11 of Fig. 10;

Fig. 15 is a detailed top plan view of the steering lock-out;

Fig. 16 is a sectional view on the line 16—16 of Fig. 15;

Fig. 17 is a fragmentary side elevation showing a wheel construction embodying gear teeth adapted for engagement with a rack attached to the track;

Fig. 18 is a fragmentary sectional view of same on line 18—18;

Fig. 19 is a fragmentary elevation of another modification of the invention in which a metal tire extension is adapted as an earth roller or tamper;

Fig. 20 is a fragmentary sectional view on line 20—20;

Fig. 21 is a side elevation of the magnetic brake attached to the vehicle in Fig. 12;

Fig. 22 is a sectional view of the magnetic brake; and

Fig. 23 is a fragmentary section of a metal tire with cleats on the circumference for use on soft ground.

Figure 13:
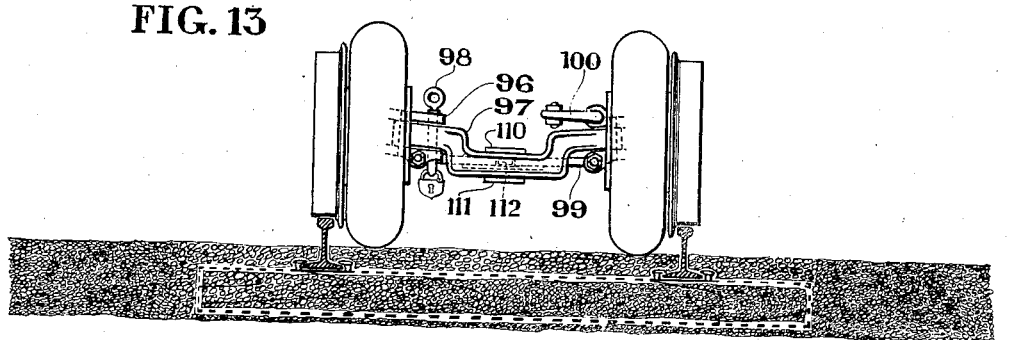
Fig. 13 is a front elevation of the front wheels of the truck in operation on the rails.

In accordance with the present invention trucks or motor vehicles are so constructed as to operate on a pavement or highway, or on rails such as the standard railway tracks or the like, using either the highway or the rails either constantly or intermittently. For this purpose the wheels of the vehicle are provided with pneumatic tires adapted for operation on a pavement and are also provided with steel tires shaped and spaced to fit the rails of railroad tracks or the like and to operate thereon. As the essential parts of the wheels of the vehicle are detachably mounted on an axle part, the wheels may be easily and readily adapted for other purposes such as tamping, rolling, etc.

Each of the wheels of the vehicle, in accordance with the present invention, may have a single pneumatic tire or dual pneumatic tires. However, it is preferred that the front wheels should each have a single pneumatic tire while the rear wheels are of the dual type. The two rear wheels 10, as shown in Figs. 1, 2 and 3, are each similar in construction, having a hub 11 suitably keyed or splined for attachment to the driving axle of any ordinary motor truck or vehicle construction. On the hub 11 are detachably supported the two tire rims 12 and 13, each of which has an extension plate 14 through which the attaching bolts 15 extend. The attaching bolts 15 also pass through holes provided in the plate portion 16 of the hub and through a suitable brake drum section 17. The usual retaining nut, not shown, is provided on the end of the axle to hold the wheel hub in position. The holding nuts of the bolts 15 are readily removable so that either one or both of the pneumatic tires can be removed and replaced on the wheel hub.

Each of the rims 12 and 13 is provided with a pneumatic or inflatable tire, the two tires 18 and 19 each having a rubber tread adapted for operation on a road or pavement. Between the tires 18 and 19 is a metal rail engaging tire 20, having a flange 21 for cooperation with the side of the rail. As shown in Figs. 1 and 3 a flange 21 is provided adjacent each end of the steel tire 20. The tire 20 is supported by a plate member 22 on which are bosses 23 having holes through which the attachment bolts 15 extend. The bosses 23 space the rim extension plates 14 apart a suitable distance so that there is some clearance space as indicated at 25 between the ends of the steel tire and the sides of the inflatable tires in order that stones or rocks will not pass between the steel tire and the inflatable tires. The space 25, however, permits the lateral expansion of the pneumatic tires when the load of the truck is assumed, without destructive rubbing against the sides of the steel tire.

As shown in Fig. 4, the steel rail engaging tire of a rear wheel may be yieldingly connected to the hub so that the usual shocks encountered by a vehicle operating on tracks are effectively absorbed. In this form of construction the hub 28 is securely attached to the inner portions 29 of the rail engaging member, preferably in a readily detachable manner, as shown. The peripheral portions of the member 29 provide a wheel felly 30 having an outer surface 31 which is conically tapered. Fitting on the conical surface 31 is the inner conical surface of an annular wedge ring 32 which is split at one portion so that it can expand and contract. Surrounding the wedge 32 is an inflatable tire or yielding rubber cushion 33, the cushion 33 substantially filling the space between the outer cylindrical wall of the wedge and the inner wall of the rail engaging tire 34, one side of which extends inwardly as shown at 35 alongside the side portion of the inner wheel portion 29. The other side of the rail engaging tire is formed of the removable end plate 36 which is retained by a split holding ring 37 seating in an annular notch in an end portion of the steel tire.

As shown in this construction, the two pneumatic tire rims are provided at some distance from the ends of the steel tire so that there is a comparatively wide spacing between the two pneumatic tires 40 and 41, leaving a suitable space 42 between each pneumatic tire and the rail engaging tire to prevent destructive rubbing of the pneumatic tires on the steel tire. The spacing provided between the pneumatic tires, and the substantial closure for this spacing which is afforded by the steel tire prevents rocks or the like from wedging between the pneumatic tires and thus injuring their casings.

The various parts of the wheel shown in Fig. 4 may be assembled by first applying the plate extension 43 of the rim 44 together with the brake drum section to the fastening bolts 45 after which the felly of the tire engaging wheel is assembled. The steel tire 34 is placed so that its end 35 is adjacent the side of the wheel felly, suitable packing material 46 being employed in an annular slot or notch in the side portion 29. The cushion 33, which is preferably a single long tube closed at both ends, is then laid in the steel tire in several coils or turns, with the stem or valve portion applied to a small slot extending radially in the wheel felly. The annular wedge or expansion ring 32, which is also slotted to re-receive the valve stem, is then moved in axially thus compressing the cushion 33 outwardly and reducing the radial distance occupied by the cushion between the wheel felly and the inside diameter of the tire 34. The retaining plate 36 is then moved in place, with packing 46 applied between it and the outer side of the wheel felly, and the expansible split holding ring 37 is then expanded into the notch in the steel tire. The plate or disk 47 of the pneumatic tire rim 48 is then moved into position and the nuts 49 then tightened. The various parts may be readily disassembled by carrying out the above procedure but in a reverse order.

In the form of construction which has been described it will be apparent that a considerable amount of yielding movement is permitted between the steel tire and the hub, thus cushioning the shocks encountered while the vehicle is operating on tracks, but the various parts are so arranged that axial or endwise movement of one part of the wheel with respect to another is prevented. The use of long pneumatic or solid rubber cushion wound in several turns within the steel tire permits the effective utilization of the comparatively long but shallow space afforded in a tire of comparatively small diameter.

The front wheels of the truck as well as the rear wheels may be so constructed that the steel rail engaging tire is supported yieldingly on the hub. As shown in Figs. 5 and 6 in which a front wheel of the truck is illustrated, each comprises a hub 51 to which is firmly connected in a detachable manner a rim 52 for the pneumatic tire 53. At one side of the pneumatic tire is the rail engaging metal tire 54 having a suitable outwardly extending flange 55 for cooperation with the side of the rail. The tire 54 is supported yieldingly on its hub portion 56 by means of a pneumatic or solid rubber cushion 57 which may be laid in turns against the inner surface of the tire 54. An annular split spacing or shim ring 58 is preferably applied to the inside portions of the cushion 57, and a tapered split wedge 59, having a conical surface engaging a correspondingly conical surface on the outside of the supporting felly 60 is forced axially in a right-hand direction to expand the spacing ring 58. The spacing ring prevents the wedge from injuring the cushion as the wedge is applied. The wedge and spacing ring as well as the cushion are retained by the end disk or plate 61 which is held in place by the expansible retaining ring 62.

The inside surfaces of the steel tires 34 and 54, as shown in Fig. 7, are not smooth cylinders but on the contrary are somewhat corrugated or roughened as indicated at 64, and the split ring or sleeve 58 is also similarly formed with axially extending corrugations so as to prevent any substantial relative turning movement of the wheel felly with respect to the steel tire and serve adequately to transmit the driving force from the wheel hub to the steel tire. Cooperating projections and depressions 66 are also provided between the wedge ring 59 and the spacing ring and wheel felly to prevent relative turning movements of these parts during operation.

Fig. 8 shows a modified form of wheel construction in which the steel rail engaging tire 65 which is provided along side the pneumatic tire 66 is yieldingly supported by a solid rubber cushion designated generally 67. In this form of construction there is a toothed or corrugated annular rubber cushion member 68 cemented or vulcanized to an outer steel ring 69, both of these parts being split at one point to provide for contraction and expansion in order to facilitate assembly within the rail engaging tire 65. Preferably the steel surface portion 69 extends beyond the end rubber teeth 69' as shown at 72 for cooperation with an extension lug 73 provided on the inside surface of the steel tire for effectively transmitting the drive from the cushion to the tire. Fitting in the depressions provided by the various teeth of the cushion member 68 are the toothed projections of a second or inner rubber cushion member 74 which is secured to an inner steel ring 75, these parts being also split at one end. The two rubber cushion members can be compressed by drawing their split ends together and can then be applied within the tire 65. A tapered split wedge 76 having a notch 77 cooperating with a lug on the steel surface 75 and having a projection 78 cooperating with a notch on the wheel felly 79, is then forced in axially to expand the cushion members firmly against the inside cylindrical surface of the tire, compressing the rubber teeth so that these teeth will not move apart at the upper portion of the wheel when a load is applied to the wheel. It will be understood that the various parts will be held in their assembled relationship in the same manner as in the forms of construction already described. The use of the rubber teeth permits relative cushioning movement in a radial direction without producing rubbing or wear on the cushion, the teeth affording substantial vertical movement of the wheel hub with respect to the tire 65 at the sides of the wheel as well as at the top and bottom.

Figs. 10 and 11 show another modification of the invention utilizing a solid rubber cushion between the wheel felly and the steel rail engaging tire, the rubber cushion 80 having an outer metal surface 81 adapted to fit in the steel tire and having an inner metal surface 82, preferably all assembled together as a unit, for cooperation with the split wedge.

In the wheel construction shown in Fig. 9 the metal rail engaging tire 85 is supported yieldingly on the wheel felly 86 by means of corrugated metal springs 87 and 88. The inner points of contact of the spring 87 bear against a split wedge 89, spring 87 having a projection 90 which cooperates with a retaining slot or notch in the wheel felly. The outer spring 88 has a projection 91 fitting in a notch provided in the rim 85. Thus there is an effective driving connection between the felly 86 and the steel tire through the spring, the spring affording resilient or yielding mounting of the tire so as to smooth out the shocks that would otherwise be produced.

Figure 14:
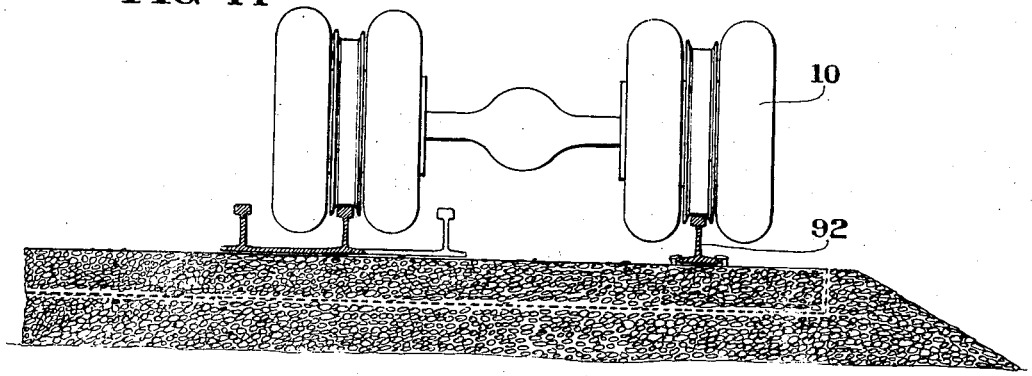
Fig. 14 is a rear elevation of the rear wheels of the truck.
Figure 12:
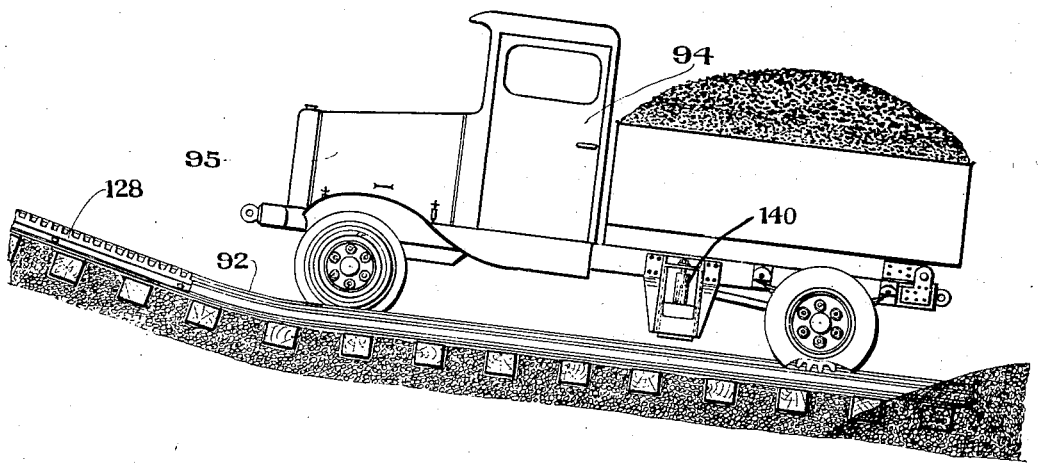
Fig. 12 is a side elevation of a truck embodying the invention and showing the manner of its application.

The use of a wheel of the character herein described on an automobile or motor driven truck permits the vehicle to operate on the rails 92 of a railway track or the like, see Figs. 13, 14 and 15, while permitting operation of the vehicle along a pavement or rough roadway. The rail engaging tires of the truck may be so spaced apart as to cooperate with existing railways or with special rails installed for grading operations or the like. The figures of the drawing just referred to show how the invention may be utilized for grading purposes. The truck 94 may be driven by an internal combustion engine provided within the hood 95, the power being supplied through the usual differential drive to the two rear wheels. These wheels may be run along the tracks 92 in transporting the load from one point to a disposal point. Fig. 12 shows how the truck load may be dumped at a disposal point, the rear wheels of the truck being backed entirely off the track end and running on their pneumatic cushions beyond the ends of the track so that the load can be disposed at a desired point beyond the tracks. After disposing of the truck load, the truck may be mounted again on the tracks and then driven on the tracks in rough country until a pavement or roadway is reached. If the tracks are continued at the side of the road the truck may remain on the tracks, or if desired the truck may be driven off of the tracks and continue on the roadway as occasion may require.

To facilitate the operation of mounting the truck on tracks, and driving off of the tracks, at certain intervals the space between the rails and some little distance outside the rails may be filled in with soil or rock to a suitable height so that the pneumatic tires can assume the load of the truck and raise the rail engaging tires from the rails so that the truck can be readily driven onto or off of the rails, or if desired suitable frogs and switches can be used at desired points to provide a means of readily getting to and from the track, and from one track to another.

When the vehicle is operated on tracks it is desired that the front steerable wheels of the truck should be locked for straight ahead movement. To accomplish this ears 96 may be provided on one of the front wheels, these ears having holes aligned vertically with a hole passing through the front axle 97. A padlocked pin 98 extends through the holes in the ears and in the axle while the truck is operating on the rails, this pin being readily removable to release the wheels so that the vehicle can be steered on the highway. Inasmuch as both wheels are tied together by the steering crossbar 99 the pin 98 serves to lock both front wheels against steering movement that could otherwise be imparted to the steering yoke 100.

Figs. 13, 15 and 16 show a locking means that can be used in conjunction with or in place of the removable pin 98. The front axle 97 is provided with plates 110 and 111 in which is a slidably mounted locking bolt 112. The locking bolt passes through a slot 113 in the cross bar 99 and projects into a notch 114 in the front axle. The locking bolt may be withdrawn by a rod 115 operated from the driver's position in the truck to release this bolt from the notch in the front axle and from the slot in the crossbar 99 thus affording endwise movement of the bar 99 which is controlled from the driver's seat by the usual steering wheel. However, when the bolt 112 is in the position shown in Figs. 15 and 16 all endwise movement of the steering tie bar 99 is prevented and the wheels are held in straight ahead position.

It will be apparent that the rail engaging tires of the wheels, which are made of smaller diameter than the tread diameter of the pneumatic tires, are effective in case of a puncture of a pneumatic tire in preventing serious injury or damage to the pneumatic tire, or upsetting, as the load is assumed temporarily in such a contingency by the rail engaging tire. The rail engaging tire is also effective in preventing rocks or other damaging pieces from wedging between the two casings of a dual tire wheel, and is also effective in assuming and distributing the load when the vehicle is operating on extremely soft ground into which the pneumatic casing may be forced to an unusual distance.

In carrying out grading operations it is frequently desirable to run a track at a comparatively steep grade, and to give an adequate tractive drive, when the truck is running on rails up or down such an incline, a construction such as is shown in Figs. 17 and 18 and also in Fig. 12 may be employed. Referring more particularly to Figs. 17 and 18, the wheel hub 120 may be provided with the brake drum 121 and the flanged member 122. An angle member 123 is riveted to the flanged member 122, and serves as a support for the pneumatic tire rim 124, which is riveted in place thereon, and also as a support for the detachably connected steel wheel 125. A pneumatic tire 126 is provided on rim 124. In this construction the members 121, 122, 123 and 124 are rolled steel parts which are cheaply and readily made and assembled together. The steel wheel or tire 125 is provided with a gear 127 which engages a rack 128 firmly secured at one side of the supporting rail 129, such gear and rack being duplicated at each side of the track. The pitch circle of the gear is preferably made to correspond in size to the diameter of the rail engaging surface of the steel wheel 125. Inasmuch as the two rear wheels are driven by the engine through the usual kind of a differential driving connection it will be apparent that with the two rear wheels in positive driving engagement with the tracks, a steep grade can readily be maneuvered, and the tracks may be curved, if desired, without detracting from the positive drive engagement of the wheels. This however would not be the case if the two rear wheels are both geared to the track and mounted on a common driving wheel in accordance with the usual construction of rail vehicles.

The metal tire 125 may be readily disconnected from the angle member 123, and may be replaced or augmented by a second pneumatic tire and tire rim, if desired, or it may be replaced by another form of ground engaging member such as the "sheep's foot" tamper 130 shown in Figs. 19 and 20. This tamper is provided with a number of tamping feet 131 mounted on a common cylindrical ground engaging surface 132 which may be constructed as an extended tire member suitably fastened to the disk portion 133 by means of which it is readily bolted to the wheel member 120 or 123. Such a wheel or other earth rolling or tractive wheel equipment may be readily applied to the truck to equip it for tamping, rolling or grading purposes, or for increased tractive effect over soft or slippery ground. A farmer can therefore readily adapt his truck to travel on rails, or to travel on pavement, and when it becomes necessary for him to use his truck as a tractor, for example, or as a tamper for earth rolling apparatus, he can remove the pneumatic tires and equip his truck with a cylindrical ground engaging tire member or with a sheep's foot tamper or other desired form of wheel. Fig. 23 shows one form of wheel member which a farmer may use for giving increased tractive effect. In this case, the rail engaging metal tire 135 corresponds in construction to the tire 54 of Fig. 6, except that there is no flange 55. This cylindrical tire member 135 may be used for rolling purposes, or if the truck is to be used as a tractor or for pulling effect, the detachably mounted cleats 136 may be bolted on the rim of the tire, the cleats being added in any desired number and spacing arrangement around the periphery.

Figs. 21 and 22 show the magnetic pneumatic brake which is designated generally by the reference numeral 140 in Fig. 12. Such a brake is provided on each side of the vehicle chassis and provides a braking effect very greatly exceeding that which is obtainable by braking the wheels of a metal rail engaging tire. Compressed air is supplied when desired through a conduit 141 to a movable cylinder 142. The upper end of the cylinder is closed by a fixed disk 143 while the lower end of the cylinder is secured to a magnet 144. When air is supplied to the cylinder the magnet is forced down into engagement with the rail 92, and as the magnet is moved down current is supplied to the magnet winding through wires 145 causing the magnet to exert a high braking effect as the magnet drags along the rails. Such an arrangement is particularly desirable where the truck is being maneuvered up and down steep grades, since the coefficient of friction of a steel wheel and a steel rail is quite small and only comparatively small braking effect is obtainable, in the usual arrangement.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A vehicle wheel comprising a hub, a wheel felly supported on said hub, a flanged metal tire adapted for operation on a rail and supported by said felly for radial movement thereon, a double ended inflatable tube in helical form between said felly and said metal tire for yieldingly restraining relative radial movement of the tire and felly, and a tapering split wedge having a frusto-conical surface and provided between said tube and said wheel felly and movable axially to compress said tube against said tire.

2. A vehicle wheel comprising a hub, a wheel felly supported on said hub, a metal tire supported by said felly for radial movement thereon, resilient means between said felly and metal tire, means for retaining said metal tire against axial movement on said felly, a separate expansible metal ring shim in engagement at one side thereof with said resilient means and disposed radially of said resilient means, and an annular wedge provided within said metal tire and engaging the other side of said ring shim and movable axially thereof to compress said resilient means.

3. A vehicle wheel comprising a hub, a wheel felly supported on said hub, a metal tire supported by said felly for radial movement thereon, resilient means between said felly and metal tire, means for retaining said metal tire against axial movement on said felly, a separate expansible metal ring shim in engagement at one side thereof with said resilient means and disposed radially of said resilient means, and an annular wedge provided within said metal tire and engaging the other side of said ring shim and movable axially thereof to compress said resilient means, said metal tire having an irregular internal surface adapted for gripping effect on said resilient means.

4. A vehicle wheel comprising a hub, a wheel felly supported on said hub, a metal tire supported by said felly for radial movement thereon, resilient means between said felly and metal tire comprising a double ended inflatable tube in helical form on said felly for yieldingly restraining relative radial movement of the tire and felly, means for retaining said metal tire against axial movement on said felly, an expansible metal ring shim in engagement at one side thereof with said resilient means and disposed radially thereof, and an annular wedge provided within said metal tire and engaging the other side of said ring shim and movable axially thereof to compress said resilient means.

EDWARD O. KEATOR.